Patented Aug. 13, 1935

2,011,465

UNITED STATES PATENT OFFICE 2,011,465

PROCESS FOR INHIBITING THE DISCOLORATION OF FRUITS AND VEGETABLES

Arnold K. Balls and Walter S. Hale, Washington, D. C., dedicated to the free use of the Public No Drawing. Application February 28, 1934, Serial No. 713,374

11 Claims. (Cl. 99—1)

(Granted under the act of March 3, 1883, as amended April 30, 1928; 370 O. G. 757)

This application is made under the act of March 3, 1883, as amended by the act of April 30, 1928, and the invention herein described may be manufactured and used by or for governmental purposes without the payment to us of any royalty thereon.

We hereby dedicate the invention herein described to the free use of the public, to take effect upon the granting of a patent to us.

The object of this invention is to delay or prevent the discoloration which occurs on the cut surfaces of many varieties of fruits and vegetables.

It is to be understood that the expression "cut surfaces" means whenever the skin is substantially severed, pierced, abraded, or otherwise removed, so that the flesh of the fruit and/or vegetable becomes exposed to the surrounding media.

Many fruits and vegetables darken more or less rapidly at freshly cut surfaces, particularly when they are exposed to the air. This darkening is generally the formation of a brown pigment, but may in some cases be the development of a bluish or reddish color. The chemical mechanism of this darkening is not always the same, but invariably consists of an oxidative process, in which one or more substances in the plant tissue are oxidized. They combine either with the oxygen of the air, or with oxygen in the form of peroxides. Some of the oxidation products formed are colored. In all cases of natural products the course of the oxidation by which such colored substances are formed is catalyzed by oxidative ferments, or enzymes, also present in the fruit or vegetables. In most cases, the discoloration would occur so slowly as to be unimportant if these ferments were absent, since it would then be possible to dry or otherwise preserve the material before the reaction had taken place to an appreciable extent.

The preparation of many dried cut fruits is today made by treating them with sulphur dioxide, which acts as a deterrent of the enzyme action referred to. An advantage of our process is that it enables one to prepare such dried fruits in the usual manner, but without treatment with sulphur dioxide. Another advantage is that it permits fruits and vegetables which would normally turn dark after cutting to be preserved in the moist state for considerable lengths of time, without the development of this discoloration. A further advantage is that our process employs certain substances which are themselves food products or are isolated from food products, in the latter case by using such small quantities that the odor or taste of the product is not affected.

Our invention concerns the inhibition of the oxidative enzymes which accelerate one or more stages of the discoloration process. Among these enzymes the ferment peroxidase frequently plays an important role. The inhibition is accomplished by treating the cut surface of the product with a dilute solution of a sulphydryl compound. We have found for the purposes of our invention that sulphydryl compounds are suitable for this purpose, provided they do not possess unpleasant odors or objectionable toxic properties. We have also found for the purposes of our invention that sulphydryl compounds, notably organic acids containing this group, are free from objection. We have found to be especially suitable for our purpose the sulphydryl-containing amino acids, and peptides built up in part therefrom. More especially, we have found the amino acid cysteine and the tripeptide glutathione eminently suitable for our purpose.

We apply these substances in solution in water or dilute acids, as may be most convenient. We have found that it is not usually advisable to use alkaline solutions, as the reactions to be inhibited are accelerated by reduced acidity. For very acid fruits, a water solution is sufficient. For more nearly neutral fruits a solution in dilute hydrochloric acid (containing say one hundredth to one-tenth percent by weight) is preferable. For amino acids not soluble in water, the solution of the hydrochloride should be used. The application of the solutions to the product may be made by dipping the cut fruit into the solution, or more efficiently, if the material is to be dried, by spraying the cut material with the solution in such a manner as to bring the spray in contact with the cut surfaces.

The concentrations of the inhibitors themselves, we have found, should vary with the nature of the material, and with the result desired. For example, not all varieties of apples darken with equal rapidity, and those which do not darken fast do not require as much inhibitor. Furthermore, if a light brown dried apple is desired, less inhibitor should be used than if a practically white product is to be made. The concentration may vary, therefore, within wide limits, but we have found that concentrations between one-twentieth percent and five-tenths percent by weight of cysteine or glutathione are suitable for ordinary purposes.

We have found that solutions of approximately the same concentrations, as indicated above, have proven satisfactory when applied to potatoes, turnips, and the like.

Substances similar to the above described inhibitors probably occur in the juices of certain plants since these juices, used in the manner described also inhibit the darkening of cut fruits and vegetables exposed to the air while drying. This conclusion also follows from the fact that glutathione or a related substance is present in the papaya and the pineapple as an activator to the characteristic protease of these plants. We find that a juice or a water extract of the papaya or of the pineapple fruit is especially adapted for use as an inhibitor. The juice may be used in its natural state or diluted with water, depending upon the concentration of inhibitory substance required, or it may be first fermented with yeast, the yeast removed by known methods, and the alcohol distilled off. The residual liquid after this process also contains an inhibitor, and may be used in place of the inhibitory solutions described above.

The plant extracts which may be used for this purpose are themselves susceptible to oxidation, which removes the active principle (the inhibitory—SH→S–S). Such extracts can be restored frequently to their original potency, and sometimes to a potency higher than the original, by treatment with reducing agents by the usual methods. Hydrogen sulphide is one such reducing agent, and convenient because it may be removed afterwards from the inhibitor before this is used in the above process.

Having thus fully described our invention, what we claim for Letters Patent is:

1. A process of inhibiting the discoloration of cut fruits and vegetables, comprising the subjection of such articles to a sulphydryl compound.

2. A process for inhibiting the discoloration of cut fruits and vegetables, comprising the subjection of such articles to an organic acid containing a sulphydryl group.

3. A process for inhibiting the discoloration of cut fruits and vegetables, comprising the subjection of such articles to a sulphydryl-containing amino acid.

4. A process for inhibiting the discoloration of cut fruits and vegetables, comprising the subjection of such articles to a sulphydryl-containing peptide.

5. A process for inhibiting the discoloration of cut fruits and vegetables, comprising the subjection of such articles to cysteine.

6. A process for inhibiting the discoloration of cut fruits and vegetables, comprising the subjection of such articles to glutathione.

7. A process for inhibiting the discoloration of cut fruits and vegetables, comprising the subjection of such articles to an extract of a plant containing an active enzyme of the papain type.

8. A process for inhibiting the discoloration of cut fruits and vegetables, comprising the subjection of such articles to a papainase activator which has been subjected to the action of hydrogen sulphide.

9. A process for inhibiting the discoloration of cut fruits and vegetables, comprising the subjection of such articles to an extract of a plant containing an activator of an enzyme of the papain type.

10. A process for inhibiting the discoloration of cut fruits and vegetables, comprising the subjection of such articles to an extract of a plant containing an activator of an enzyme of the papain type, which has been subjected to the action of hydrogen sulphide.

11. A process for inhibiting the discoloration of cut fruits and vegetables, comprising the subjection of such articles to an extract of a plant containing an activator of an enzyme of the papain type from which fermentable substances have been removed.

ARNOLD K. BALLS.
WALTER S. HALE.